United States Patent

[11] 3,631,416

[72] Inventor Flemming Thorsoe
Augustenberg, Denmark
[21] Appl. No. 864,571
[22] Filed Oct. 6, 1969
[45] Patented Dec. 28, 1971
[73] Assignee Danfoss A/S
Nordborg, Denmark

[54] GENERATOR FOR PRODUCING CONTROL IMPULSES FOR STRIKING THE CONTROL-TABLE RECTIFIERS OF A THREE-PHASE INVERTED CONVERTER
3 Claims, 5 Drawing Figs.

[52] U.S. Cl. .................................................. 340/174 SR, 340/174 CT
[51] Int. Cl. .................................................. G11c 19/00, G11c 11/08
[50] Field of Search .......................................... 340/174; 307/221; 305; 321/5

[56] References Cited
UNITED STATES PATENTS

| 3,154,764 | 10/1964 | Richards | 340/174 |
| 3,365,638 | 1/1968 | Risberg | 318/207 |

Primary Examiner—James W. Moffitt
Attorney—Wayne B. Easton

ABSTRACT: The invention relates to a generator for producing control signals for striking the controllable rectifiers of a three-phase inverted converter having common quenching means. The generator is a slide-type impulse-storing type of device which is actuated in synchronism with quenching impulses and has six bistable stages. The output of the third stage is applied to the input of the first stage by way of an inverter. Each stage is associated with one of the controllable rectifiers and the control signals transmitted are dependent upon the switching conditions of the stages.

GENERATOR FOR PRODUCING CONTROL IMPULSES FOR STRIKING THE CONTROL-TABLE RECTIFIERS OF A THREE-PHASE INVERTED CONVERTER

The invention relates to a generator for producing control signals for striking the controllable rectifiers of a three-phase inverted converter having common quenching means.

In the case of inverted converters having common quenching means for all the rectifiers, considerable saving in components is achieved since it is not necessary to associate a quenching circuit with each individual rectifier. On the other hand, provision must be made for each quenched rectifier, that has to remain conducting after completion of the phase program to be immediately struck again after quenching. If each rectifier is to be kept open over 180 electrical degrees, then, within one cycle, at least three consecutive striking signals, each shifted through 60°, are required. In this connection, it is useful to take as a basis a frequency that is six times as great as the required frequency, since the quenching impulses can be directly derived from this initial frequency. In order to produce the control signals (individual impulses, succession of impulses or direct current blocks) at the correct moment and in the correct sequence, some expense and trouble are necessary in the provision of logic circuits.

In a known generator, there is provided for each controllable rectifier a gate circuit which is fed with trigger impulses and in each case is controlled by the output from a six-stage ring counter. Since, in the case of a ring counter of this kind, only one output is normally conducting at any time, the counter has to be modified in such a way that more than one controllable rectifier is struck. In the known generator, use is made for this purpose of a ring counter having NAND stages which are interconnected by an artificial circuit in such manner that two adjacent stages are always conducting. The cost of this is extremely high. Furthermore, the rectifiers are only conducting over 120°.

The object of the invention is to provide a generator of the above-described kind which enables a considerably simpler construction to be used and which also permits the rectifiers to be kept in the conducting condition over 180°.

According to the invention, this object is achieved by means of a slide-type impulse-storing device, which is actuated in rhythm with the quenching impulses and comprises six bistable stages, the output of the third stage of which is applied to the input of the first stage by way of an inverter, each stage being associated with one of the controllable rectifiers and the control signals being sent in dependence upon their switching condition.

Slide-type impulse-storing devices can be constructed in a relatively simple manner. Each individual stage has simply to be connected to the preceding and following stages. By returning the output signal of the third stage to the input of the first stage by way of an inverter, there is automatically obtained a pattern of three consecutive "1" conditions and three consecutive "0" conditions, which are constantly shifted by the slide-type impulse-storage device. Three rectifiers can accordingly be struck each time. The rectifiers remain conducting over each 180°.

It is then only necessary for the rectifiers to be correctly connected, for example by, in each case, associating three consecutive stages with rectifiers of the three branches of the inverted converter and two adjacent stages with rectifiers of different polarity of the inverted converter.

It is particularly advantageous if each stage comprises a semipermanent storage means, e.g., a magnetic core. If the inverted converter is switched off, the condition that was last present in the slide-type impulse-storage device is held. When switching on again, it is therefore not necessary to carry out a fresh read-in process or to have an artificial connection in order to force the correct working sequence. Furthermore, such control arrangements can be constructed with a minimum of electrical components that are likely to break down. The logic can even be constructed entirely of magnetic elements.

In a preferred embodiment the slide-type impulse-storing device is constructed in known manner of stages comprising multihole magnetic cores (transfluxors), and an additional hole in one magnetic core of each stage contains an input coil, carrying continuous trigger signals, and an output coil, carrying the control signals for each controllable rectifier. Here, the magnetic cores also take over in the function of a gate circuit. Depending upon whether they are in the "1" condition or the "0" condition, they either transmit or do not transmit the trigger signals to the rectifiers.

In a further aspect of the invention the inverter can also be constructed with the help of a magnetic core. Here, it is of advantage for each stage to incorporate, in known manner, a main storage core and a series-connected intermediate storage core, for a further multihole magnetic core to be provided for forming the inverter, which core is energized each rhythm and at the same time as the intermediate storage cores receives a shift impulse, and for a loop, connecting an output hole of the intermediate storage core of the third stage and the input hole of the main storage core of the first stage, also to be passed — in the opposite direction to said output hole — through the output hole of the other multihole magnetic core. If the intermediate storage core of the third stage is in the "0" condition, the other multihole magnetic core sends a "1" signal to the first stage, but if, on the other hand, the intermediate storage core is in the "1" condition, the signals produced by this and the other multihole magnetic core in the loop cease and the first stage receives an "0" signal.

In order to simplify the impulse generator, the required opening shift impulse can be passed to the intermediate storage cores simultaneously with the quenching impulse, and to the main storage cores thereafter.

The invention will now be described in more detail by reference to an embodiment illustrated in the drawing, wherein.

Figure 1:
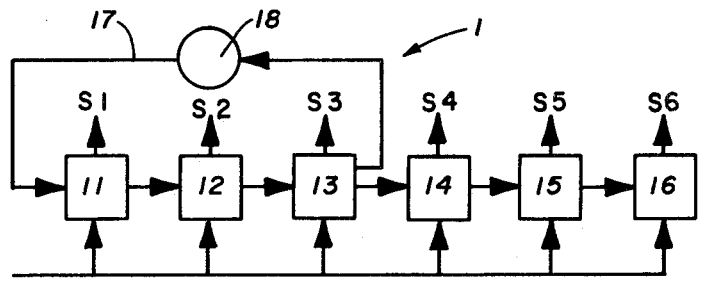
FIG. 1 is a schematic connection diagram for the generator of the invention.

Referring to FIG. 1, a slide-type impulse-storage device 1 is illustrated, and this consists of six stages 11–16, each of which can occupy two conditions "0" and "1." In the "1" condition control signals S1–S6, suitable for striking, are sent, and in the condition "0" these signals are suppressed. With the help of normal shift signals B, the content, i.e., the condition, of each individual stage is rhythmically displaced in the stage located to the right. The cadence of the shift signals B corresponds to six times the frequency at the output of the inverted converter. Between the output of the third stage 13 and the input of the first stage 11, there is provided a return loop 17 in which is contained an inverter 18.

Figure 2:
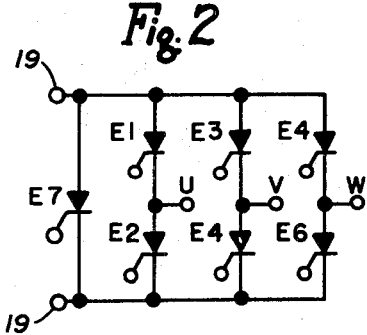
FIG. 2 is a schematic connection diagram for the rectifiers of an inverted converter, controlled by the generator.
Figure 3:
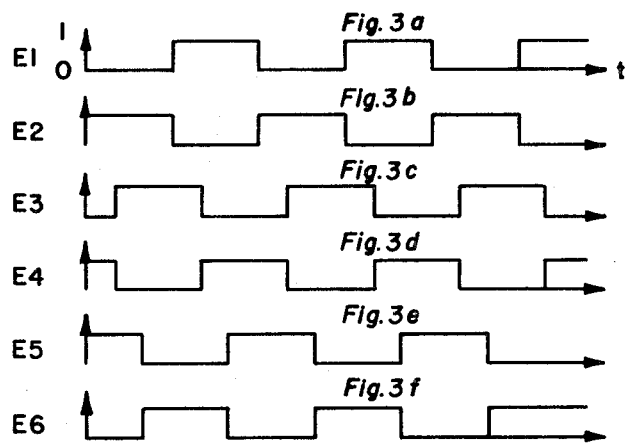
FIGS. 3A to 3F show, in different time sequences, the impulses rectifiers.
Figure 4:
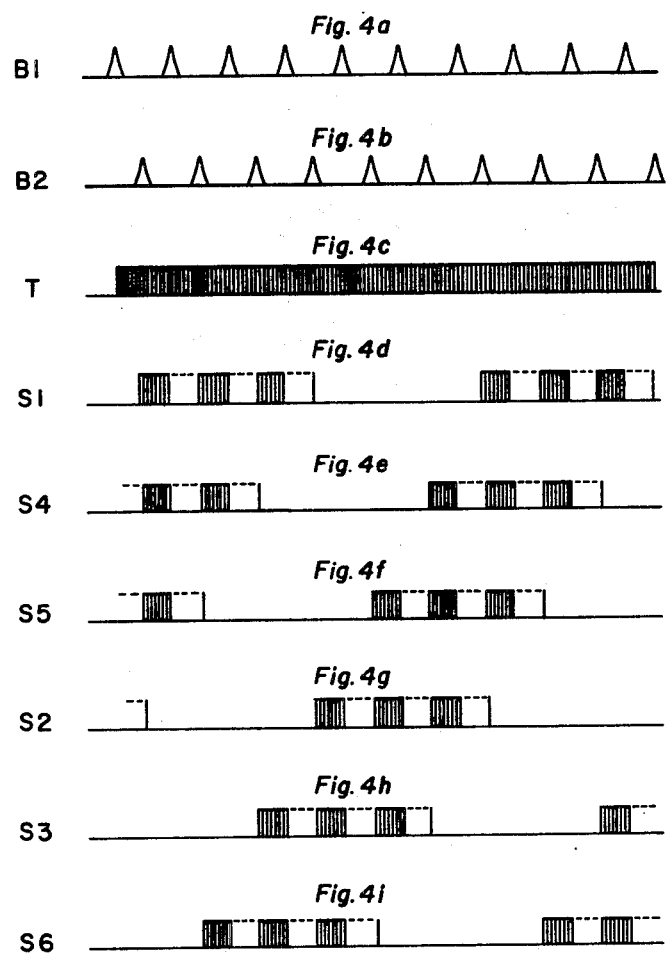
FIGS. 4A to 4I show in different time sequences, the impulses that occur.

With the help of the signals S1–S6, six controllable rectifiers of the inverted converter, illustrated schematically in FIG. 2, are controlled. With their help a three-phase alternating current voltage is produced at the output terminals U, V, W from the direct current voltage applied to the terminals 19. The rectifiers should be opened each time over 180° (condition "1" in FIG. 3A) and closed over a further 180° (condition "0" in FIG. 3A). The time-stagger, seen in FIGS. 3A to 3F, is suitable for producing a usable rotary field. A quenching circuit incorporating a quenching rectifier E7 provides for the common quenching of all the rectifiers E7–E6. For this purpose a quenching impulse is passed to the quenching rectifier E7 after each 60°. The quenching impulses thus have a frequency six times as great as the frequency required in the three-phase network U, V, W. This frequency corresponds to the frequency of the shift signals B. FIGS. 3A to 3F show that each controllable rectifier E1-E6 must be kept open over three 60° periods. This means that, immediately after quenching, striking signals which render it conducting again, must be present.

This entails each individual stage 11-16 assuming the condition "1" during three consecutive timing intervals. The arrangement shown in FIG. 1 ensures that this condition is maintained over timespans of any required length of the slide-type impulse-storing device has reached the correct initial position 1 1 1 0 0, and this initial position can be reached in a simple manner at latest after a few cycles, for example when all stages have been set to 0 prior to the commencement of operations. The inverter 18 then provides for the stages 11, 12 and 13 being filled with a 1 within the first three cycles. This group of three is shifted by the slide-type impulse-storing device, a group of three consisting of 0, and so forth, following this group on account of the inverter.

It is only necessary to cater for the correct rectifiers for each occasion to be supplied with the output signals of stages 11-16. This does not however cause any difficulties if provision is made each time for three consecutive stages to be associated with rectifiers of the three branches of the inverted converter, and two adjacent stages to be associated with rectifiers of different polarity of the inverted converter, as illustrated by the relationship of the signals S1-S6 in FIG. 1.

After being struck, the controllable rectifiers remain conducting until they are quenched. It is therefore sufficient to keep the striking signals available at the beginning of the 60° sections each time. This means that, within the 60° section, a period is available for the shift to be carried out in the slide-type impulse-storing device. Here, as is well known, the shifting operation can also be carried out in two steps, in the first step each stage is steps; in the first and in the second step each stage is filled again. This provides enhanced reliability when transmitting the information. If this mode of operation is employed impulse sequences as illustrated in FIGS. 4A to 4I are obtained.

When the shift impulses B1 occur, the information is taken from each stage. Upon the occurrence of shift impulses B2, which are produced simultaneously with the quenching impulses for the rectifier E7, the information is passed into the next stage. High-frequency trigger impulses T are available during the entire switch-in periods. Then the signals S1-S6, illustrated in FIGS. 4D to 4I, occur at the control outputs of stages 11-16. This means that if the rectifiers E1-E6 in question are to be struck, trigger impulses occur each time between the shift impulse B2 and the shift impulse B1 (cf. the blocks 20 drawn in solid lines). Since, however, the rectifiers E1-E6 are only blocked when a quenching impulse occurs, they are substantially conducting during the entire 180° (cf. the block 21 drawn in broken lines).

Figure 5:
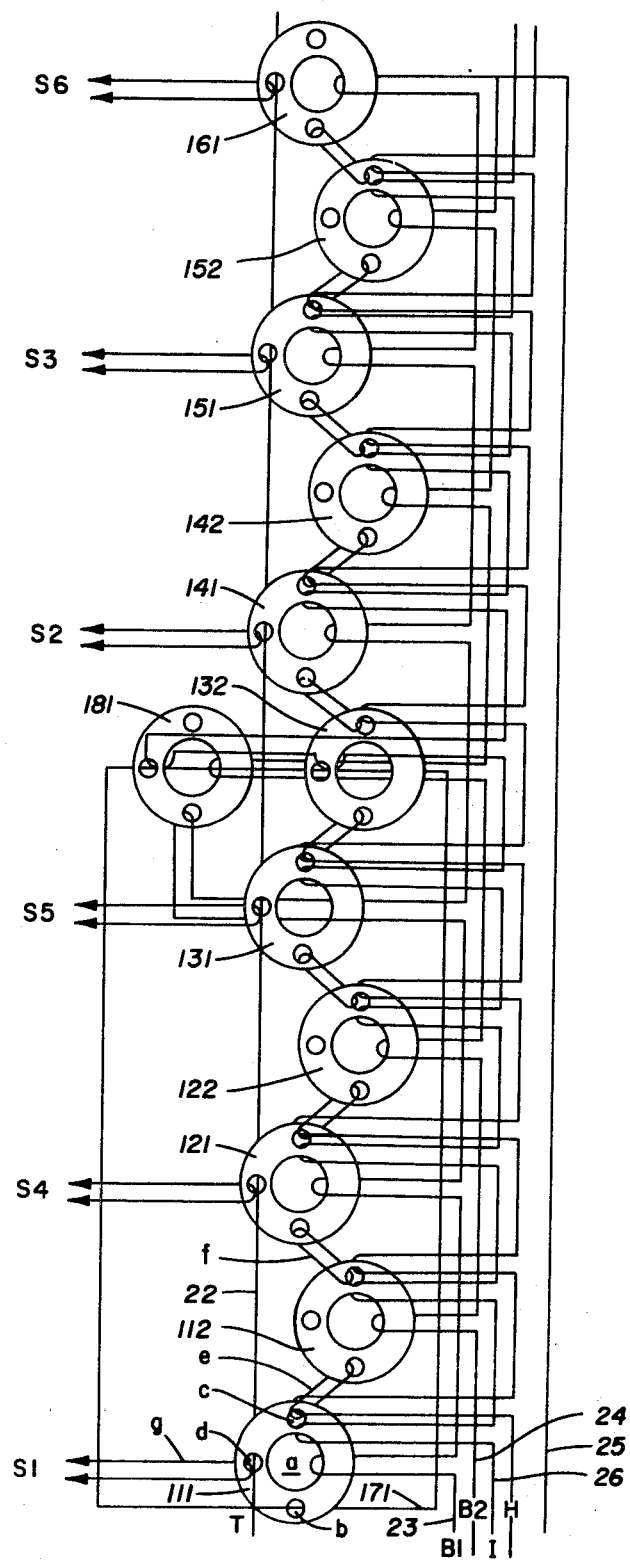
FIG. 5 illustrates a slide-type impulse-storage device, made up of a transfluxors, and such as can be used in the invention.

FIG. 5 shows a slide-type impulse-storing device which, in known manner, is made up of multihole magnetic cores, but which is modified in various ways to suit the purposes of the invention. Each stage has a main storage core 111, 121, 131, 141, 151, 161 and—except for the last stage—a series-connected intermediate-storage core 112, 122, 132, 142, 152. A further magnetic core 181 is also provided. Each magnetic core has a central hole $a$ and three further holes $b$, $c$ and $d$, which are however only used all together in the case of the main storage cores. Coupling loops $e$ and $f$, which, in each case, are passed through the output hole $c$ of the preceding core and the input hole $b$ of the following core, each connect to main storage core, e.g., 111, to the following intermediate storage core, e.g., 112 and, respectively, an intermediate storage core, e.g., 112, to the following main storage core, e.g., 121. Furthermore, each main storage core has a signal-output conductor $g$, which is passed through the hole $d$.

A conductor 23, which carries shift impulses B1, is passed through the central holes $a$ of all the main storage cores. This conductor 23 is also passed through the input hole $b$ of the core 181. A conductor 24, which carries the shift signals B2, is passed through the central holes $a$ of all the intermediate storage cores. This conductor also runs through the central $a$ in core 181. The conductor 23 and 24 are each connected at their ends to a conductor 25 which passes through the hole $c$ in all the main and intermediate storage cores. Through the conductor 25 are passed so-called holding impulses, which are identical with the shift impulses B1 and B2. There is also provided a conductor 26 which runs through all the holes $c$ of the main and intermediate storage cores as well as through the holes $d$ in the intermediate storage core 132 and in the magnetic core 181. Transmission impulses I are passed along this conductor, i.e., shortly before the occurrence of the shift impulses B1 and B2, each time. A conductor 22 passes through all the holes $d$ in the main storage core and carries the trigger signals T. A return loop 171 is passed through the input hole $b$ of the first main storage core 111 and through the output holes $d$ of the third storage core 132 and of the magnetic core 181.

For the purpose of explaining the mode of operation, let it be assumed that the main storage core 111 is energized and assumes the condition "1". A transmission impulse I in the conductor 26 causes demagnetization in the zone of the hole $c$, which prepares the transmission. Upon the occurrence of the shift impulse B1 the main storage core 111 is blocked. The change in the magnetic flux leads to magnetization of the intermediate storage core 112 by way of the coupling loop $e$. The holding impulse H, simultaneously passed through the conductor 25, prevents any feedback from the intermediate storage core 112 to the main storage core 111. The main storage core 111 is now in the condition "0" and the intermediate storage core 112 is in the condition "1". Following a further transmission impulse I, the shift impulse B2 is sent whereby the condition "1" of the intermediate storage core 112 is transferred to the main storage core 121. In this way the contents of each main storage core are each time transmitted in two steps to the next main storage core. As long as the main storage core is in the condition "1", i.e., is energized, the trigger impulses in the conductor 22 are immediately transmitted to the output conductors $g$ and thus passed to the controllable rectifiers. If, on the other hand, the core is not energized, no such transmission can take place.

The inverter magnetic core 181 is energized by each shift impulse B1 and, following a transmission impulse I, is blocked again by a shift impulse B2. Consequently, an impulse, which energizes the main storage core 111, is sent through the conductor 171. This impulse however is sent only when the third intermediate storage core 132 has reached its "0" condition. If this core is energized, there is also produced in its hole $d$, when the shift impulse B2 occurs, an impulse which is in the opposite direction to that of the impulse produced in the core 181, so that both impulses cease and no energization of the first main storage core 111 takes place.

The slide-type impulse-storing device can of course be made up of other components, for example with the help of bistable multivibrators.

I claim:

1. A generator for producing control signals for striking the controllable rectifiers of a three-phase inverted converter having three branches and common quenching means, comprising, a slide-type impulse-storing device, said device having six bistable stages for respective connections with said rectifiers and for transmitting control signals to said rectifiers in dependence upon their switching conditions, said device being actuatable at a frequency corresponding to quenching impulses for said converter, an inverter connected between the output and input respectively of the third and first stages of said device, each of said stages comprising magnetic cores having several holes, an input coil in one of said holes for transmitting continuous trigger signals, and an output coil in another of said holes for transmitting a control signal to one of said rectifiers.

2. A generator for producing control signals for striking the controllable rectifiers of a three-phase inverted converter having three branches and common quenching means, comprising, a slide-type impulse-storing device, said device having six bistable stages for respective connections with said rectifiers and for transmitting control signals to said rectifiers in dependence upon their switching conditions, said device being actuatable at a frequency corresponding to quenching impulses for said converter, an inverter connected between the output and input respectively of the third and first stages of said device, each of said stages including main and intermediate storage cores connected in series, said cores having input and output holes, said inverter comprising a multihole magnetic core having input and output holes, means for imparting shift impulses to said intermediate cores simultaneously to energize said inverter during each cycle, a loop connecting the output holes of said third stage intermediate core with the input hole of said third stage main core, said loop also passing through the output hole of said multiple magnetic core.

3. A generator according to claim 2 including means for transmitting shift impulses and quench impulses simultaneously to said intermediate storage cores and to said main storage cores thereafter.

* * * * *